United States Patent
Forster

(10) Patent No.: US 9,773,203 B2
(45) Date of Patent: Sep. 26, 2017

(54) CREATING ANTENNAS CONNECTED TO PRINTED CHIPS BY POST PROCESSING WITH A LASER OR OTHER CUTTING DEVICE

(71) Applicant: Avery Dennison Retail Information Services, LLC, Mentor, OH (US)

(72) Inventor: Ian James Forster, Chelmsford (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 21 days.

(21) Appl. No.: 14/583,257

(22) Filed: Dec. 26, 2014

(65) Prior Publication Data

US 2016/0189023 A1  Jun. 30, 2016

(51) Int. Cl.
*H01Q 1/22* (2006.01)
*G06K 19/077* (2006.01)
*H01Q 9/28* (2006.01)

(52) U.S. Cl.
CPC . *G06K 19/07786* (2013.01); *G06K 19/07718* (2013.01); *H01Q 1/2225* (2013.01); *H01Q 9/285* (2013.01)

(58) Field of Classification Search
CPC .......... H01Q 1/2225; H01Q 9/285; G06K 19/07749; G06K 19/07718; G06K 19/07786

See application file for complete search history.

(56) References Cited

U.S. PATENT DOCUMENTS

| 6,161,276 A | 12/2000 | Droz |
| 7,298,343 B2* | 11/2007 | Forster ............ G06K 19/07749 343/700 MS |
| 8,434,688 B2* | 5/2013 | Sakama ........... G06K 19/07749 235/380 |
| 2005/0034995 A1 | 2/2005 | Gundlach et al. |
| 2010/0109961 A1* | 5/2010 | Surkau ............ G06K 19/07749 343/767 |

FOREIGN PATENT DOCUMENTS

| EP | 0790123 | 8/1997 |
| WO | 2007087189 | 8/2007 |
| WO | 2013083470 | 6/2013 |

OTHER PUBLICATIONS

International Search Report and Written Opinion prepared for PCT/US2015/066967 dated Mar. 11, 2016.

* cited by examiner

*Primary Examiner* — Hoang Nguyen
(74) *Attorney, Agent, or Firm* — Avery Dennison Retail Information Services, LLC

(57) ABSTRACT

An RFID antenna structure for use with an RFID device is disclosed. A printed electronic circuit (PEC) is assembled onto an area of a conductor that is initially substantially flat, with minimal apertures cut into it. The substantially flat conductor makes the printing of the functional chip/circuit easier. Then, the conductor is cut post process with a laser or other cutting tool to create the interconnection. In another embodiment, the conductors of the PEC bridge the position where an aperture should be to create part of an RFID antenna. Further, the conductive layer and the PEC are then cut post process to create an antenna for the RFID device.

18 Claims, 2 Drawing Sheets

CREATING ANTENNAS CONNECTED TO PRINTED CHIPS BY POST PROCESSING WITH A LASER OR OTHER CUTTING DEVICE

BACKGROUND

The present invention relates generally to a radio-frequency identification (RFID) antenna structure for use with an RFID device. Specifically, the PEC or electronic circuit which includes printed elements is assembled onto an area of a conductor that is initially substantially flat, with minimal apertures cut into it. In accordance with embodiments of the present subject matter, the PEC may be designated to function as an UHF RFID chip, but may also be other forms of circuits/chips. Accordingly, the present specification makes specific reference thereto.

RFID devices are widely used to associate an object with an identification code. RFID devices can be produced in a number of different methods and commonly include some sort of chip attachment to an antenna which is then used to make an RFID device. The chip can be attached either through the use of a strap or may be applied directly to the antenna. The antenna is a conductive material which may be produced by etching, die cutting or printing of conductive ink on a substrate.

Conductive laminates such as foil laminates are used in a number of applications, ranging from containers for microwave packages to smart cards. Such laminates have regularly been created by die cutting, stamping, and other mechanical processes that generally lend themselves well to high speed situations in which a relatively simple shape or pattern can be created.

In order to obtain maximum performance from a RFID tag it is desirable that the tag is as large as possible. In particular, it is believed that increasing the length, increasing the dimension towards that of a half wave dipole, will help increase antenna gain and efficiency. However, creating such a RFID device can be expensive.

RFID devices that have small antennas tend to have a relatively narrow operating frequency bandwidth and as such are not as desirable as other options. Further, when the chip is an RFID device and the interconnection/conductor pattern is an antenna, the conductors created as part of the printed chip may not be adequate, especially in cases where a high conductivity interconnection/conductor pattern is required.

The present invention discloses an RFID antenna structure for use with an RFID device. A printed electronic circuit (PEC) is assembled onto an area of a conductor that is initially substantially flat, with minimal apertures cut into it. The substantially flat conductor makes the printing of the functional chip/circuit easier. Then, the conductor is cut post process with a laser or other cutting tool to create a high conductivity interconnection/conductor pattern.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an RFID antenna structure for use with an RFID device. A printed electronic circuit (PEC) or electronic circuit which includes printed elements is assembled onto an area of a conductor that is initially substantially flat, with minimal apertures cut into it, making the printing of the functional chip/circuit easier, and then post processing the conductor with a laser or other cutting tool to create the interconnection.

Specifically, the substantially flat conductive layer is typically formed with a narrow aperture that approximately bisects the conductive layer into halves. The PEC is then assembled onto an area of the conductive layer. The PEC comprises first and second connection points positioned on opposite sides of the aperture. The conductive layer is then cut post process to create an antenna for the RFID device.

In another embodiment, the PEC comprises first and second connection points, and a plurality of connections or conductors. The plurality of conductors in the chip bridge the position where an aperture should be to create part of an RFID antenna. Further, the conductors used in the PEC may be transparent at the frequency of operation of the laser, so that the conductive layer is cut without damaging the conductors. The conductive layer and the PEC are then cut post process to create an antenna for the RFID device. Alternatively, or in combination, the focusing of the laser may be dependent on depth, such that energy at a height above the surface where the PEC conductor is placed is relatively diffuse compared to concentrated energy at the surface of the conductive layer.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
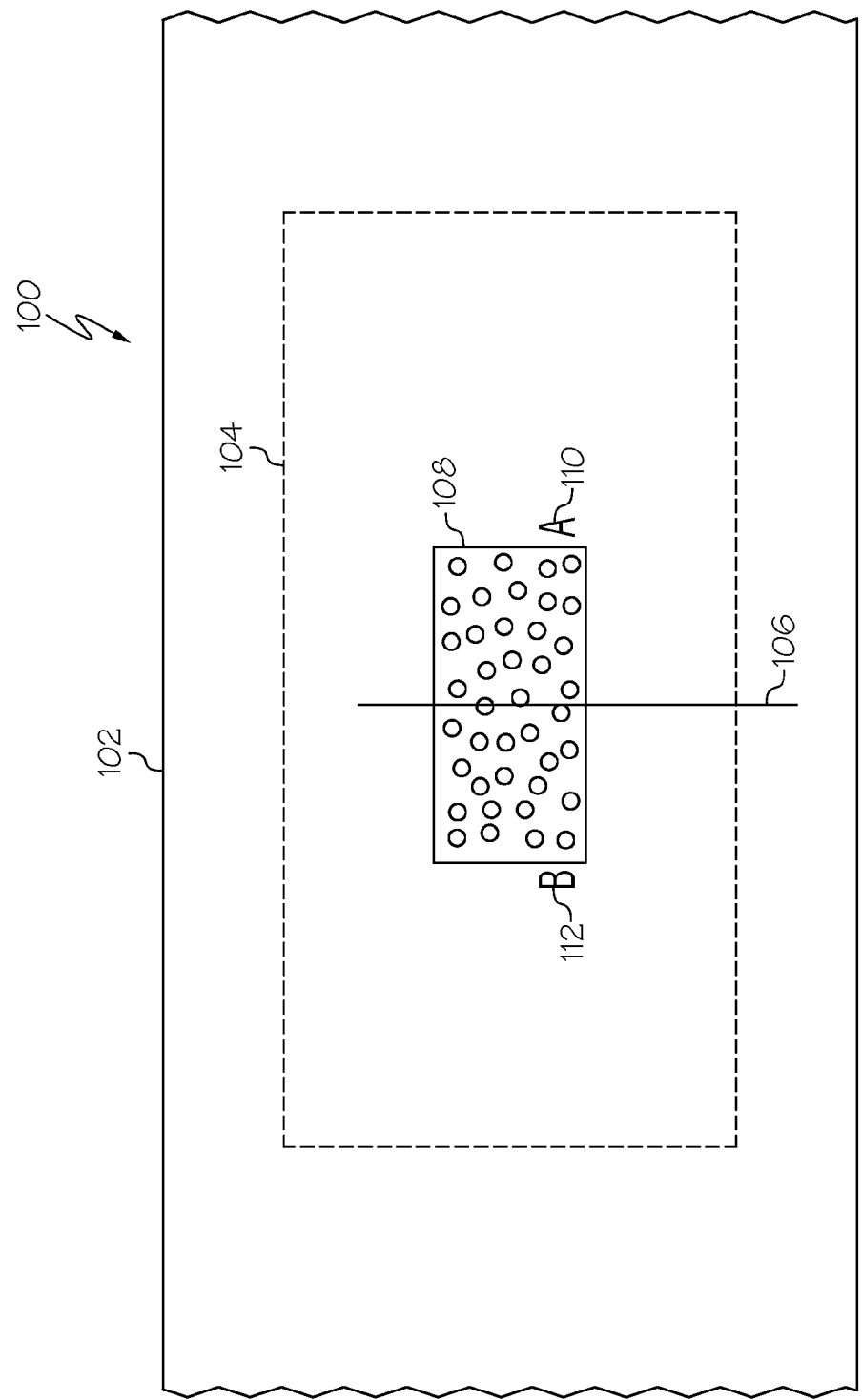
FIG. 1 illustrates a top view of the RFID antenna structure wherein the PEC is created over the initial aperture with post process cutting to create the antenna in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses an RFID antenna structure for use with an RFID device, wherein a PEC is assembled onto an area of a conductor that is initially substantially flat, with minimal apertures cut into it. The substantially flat conductor makes the printing of the functional chip/circuit easier. Then, the conductor is cut post process with a laser or other cutting tool to create a high conductivity interconnection/conductor pattern.

Specifically, the RFID antenna structure for use with an RFID device comprises a printed electronic circuit (PEC) or electronic circuit which includes printed elements that is assembled onto an area of a conductor that is initially substantially flat, with minimal apertures cut into it. The substantially flat surface of the conductor makes the printing of the functional chip/circuit easier. Then, the conductor is cut with a laser or other cutting tool post process to create the interconnection. This is particularly suitable for cases where a high conductivity interconnection/conductor pattern is required, and where the conductors created as part of the printed chip are not adequate. For example, this process would be suitable when the printed chip is an RFID device and the interconnection/conductor pattern is an antenna.

Referring initially to the drawings, FIG. 1 illustrates a first exemplary embodiment of the RFID antenna structure 100 for use with an RFID device. A conductive layer 102 is shown being substantially flat and having a large area. Allowing a PEC 108 to be created on the substantially flat surface of the conductive layer 102 enhances the printing quality of the PEC 108, as materials do not need to flow over edges in the material. Further, the conductive layer 102 is typically aluminum foil, but can be any of a variety of materials, for example aluminum, copper, silver or another thin, conductive material, for example etched or hot-stamped metal foil, or any other suitable material as is known in the art.

The conductive layer 102 can be any suitable size, shape, and configuration as is known in the art without affecting the overall concept of the invention. One of ordinary skill in the art will appreciate that the shape and size of the conductive layer 102 as shown in FIG. 1 is for illustrative purposes only and many other shapes and sizes of the conductive layer 102 are well within the scope of the present disclosure. Although dimensions of the conductive layer 102 (i.e., length, width, and height) are important design parameters for good performance, the conductive layer 102 may be any shape or size that ensures optimal performance and sensitivity during use.

The conductive layer 102 is typically formed with a narrow aperture 106 at a point in the conductive layer 102. The aperture 106 formed in the conductive layer 102, approximately bisects the conductive layer 102 into halves. However, the aperture 106 can also be positioned at any other suitable position on the conductive layer 102 as is known in the art. Typically, the aperture 106 is formed via a laser, or any other suitable cutting tool as is known in the art. The aperture 106 can be any suitable size, shape, and configuration as is known in the art without affecting the overall concept of the invention. One of ordinary skill in the art will appreciate that the shape and size of the aperture 106 as shown in FIG. 1 is for illustrative purposes only and many other shapes and sizes of the aperture 106 are well within the scope of the present disclosure.

A printed electronic circuit (PEC) 108 or electronic circuit which includes printed elements is then assembled onto an area of the conductive layer 102. Typically, the PEC is designed to function as an ultra-high frequency (UHF) RFID chip, or any other suitable functional chip/circuit as is known in the art. For example, the PEC 108 is designed to operate at frequencies between 800 MHz and 1,000 MHz, which is commonly described as ultra-high frequency (UHF). The PEC comprises first 110 and second 112 connection points, or any other suitable number of connection points as is known in the art. Typically, the first 110 and second 112 connection points are each positioned on opposite sides of the aperture 106, such that one of the connection points is positioned on one half of the conductive layer 102 and the other connection point is positioned on the other half of the conductive layer 102.

Furthermore, the conductive layer 102 is then cut 104 to create an antenna 100 for the RFID device. The cutting 104 can be die cutting or any other suitable cutting of the conductive layer 102. Specifically, the cutting 104 is done post process to create the single RFID device, with the cut area and the original aperture 106 combined to create an antenna 100 for the RFID device. The cutting 104 can be any suitable size, shape, and configuration as is known in the art without affecting the overall concept of the invention. One of ordinary skill in the art will appreciate that the shape and size of the cutting 104 as shown in FIG. 1 is for illustrative purposes only and many other shapes and sizes of the cutting 104 are well within the scope of the present disclosure.

Figure 2:
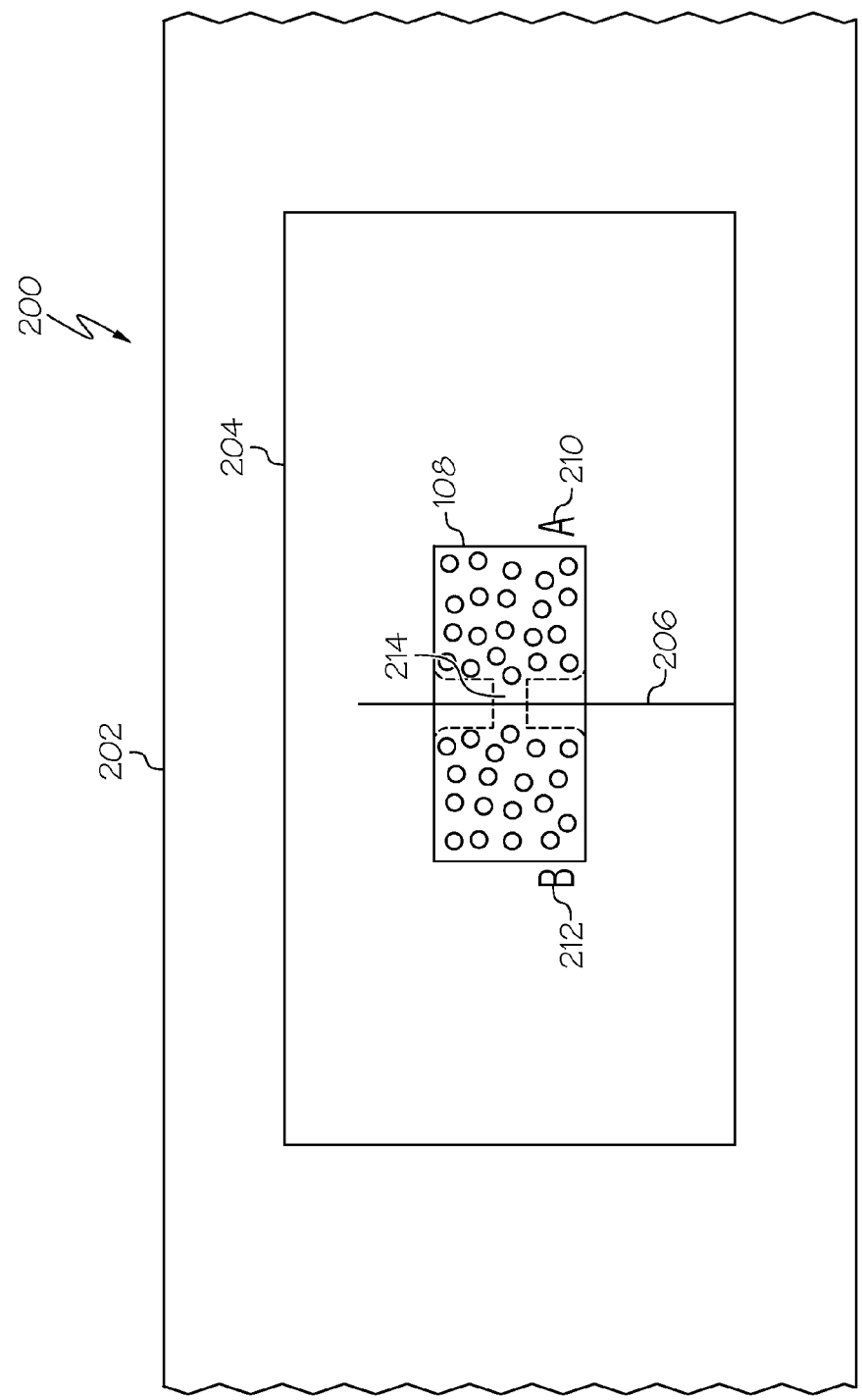
FIG. 2 illustrates a top view of the RFID antenna structure wherein post process cutting of the antenna is done through the PEC in accordance with the disclosed architecture.

Referring initially to the drawings, FIG. 2 illustrates a second exemplary embodiment of the RFID antenna structure 200 for use with an RFID device. A conductive layer 202 is shown being substantially flat and having a large area. Allowing a PEC 208 to be created on the substantially flat surface of the conductive layer 202 enhances the printing quality of the PEC 208, as materials do not need to flow over edges in the material. Further, the conductive layer 202 is typically aluminum foil, but can be any of a variety of materials, for example aluminum, copper, silver or another thin, conductive material, for example etched or hot-stamped metal foil, or any other suitable material as is known in the art.

The conductive layer 202 can be any suitable size, shape, and configuration as is known in the art without affecting the overall concept of the invention. One of ordinary skill in the art will appreciate that the shape and size of the conductive layer 202 as shown in FIG. 2 is for illustrative purposes only and many other shapes and sizes of the conductive layer 202 are well within the scope of the present disclosure. Although dimensions of the conductive layer 202 (i.e., length, width, and height) are important design parameters for good performance, the conductive layer 202 may be any shape or size that ensures optimal performance and sensitivity during use.

A printed electronic circuit (PEC) 208 or electronic circuit which includes printed elements is then assembled onto an area of the conductive layer 202. Typically, the PEC is designed to function as an ultra-high frequency (UHF) RFID chip, or any other suitable functional chip/circuit as is known in the art. For example, the PEC 208 is designed to operate at frequencies between 800 MHz and 1,000 MHz, which is commonly described as ultra-high frequency (UHF). The PEC comprises first 210 and second 212 connection points, and a plurality of connections or conductors 214. The plurality of conductors 214 in the chip bridge the position where an aperture should be to create part of an RFID antenna. Further, the conductors 214 used in the PEC 208 may be transparent at the frequency of operation of the laser, so that the conductive layer 202 is cut without damaging the conductors 214.

Furthermore, the conductive layer 202 and the PEC 208 are then cut 204 to create an antenna 200 for the RFID device. The cutting 204 can be die cutting or any other suitable cutting of the conductive layer 202. Specifically, the cutting 204 is done post process to create the single RFID device, wherein the cut area and the cut aperture 206 are combined to create an antenna 200 for the RFID device. Typically, a narrow aperture 206 is cut at a point in the conductive layer 202 that approximately bisects the conductive layer 202 and the PEC 208 into halves (as shown in FIG.

2). Further, the cutting 204 can be any suitable size, shape, and configuration as is known in the art without affecting the overall concept of the invention. One of ordinary skill in the art will appreciate that the shape and size of the cutting 204 as shown in FIG. 2 is for illustrative purposes only and many other shapes and sizes of the cutting 204 are well within the scope of the present disclosure.

As stated above, the conductors used in the PEC 208 may be transparent at the frequency of operation of the laser, so that the conductive layer 202 is cut without damaging the conductors. Alternatively, or in combination, the focusing of the laser may be dependent on depth, such that energy at a height above the surface where the PEC conductor is placed is relatively diffuse compared to concentrated energy at the surface of the conductive layer 202.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) antenna structure for use with a RFID device, comprising:
    a conductive layer;
    an aperture formed in the conductive layer, approximately bisecting the conductive layer into halves;
    a printed electronic circuit (PEC) comprising first and second connection points assembled onto the conductive layer, such that the first and second connection points are each positioned on opposite sides of the aperture; and
    wherein the conductive layer is cut by a laser to create an antenna for the RFID device and focusing the laser is dependent on depth, such that energy at a height above a surface where a PEC conductor is placed is relatively diffuse compared to concentrated energy at surface of the conductive layer.

2. The RFID antenna structure of claim 1, wherein the conductive layer is aluminum foil.

3. The RFID antenna structure of claim 2, wherein the conductive layer is substantially flat.

4. The RFID antenna structure of claim 3, wherein the aperture is a narrow aperture formed using a laser.

5. The RFID antenna structure of claim 4, wherein the PEC is designed to function as an ultra-high frequency (UHF) RFID chip.

6. The RFID antenna structure of claim 5, wherein the conductive layer is cut post process to create an antenna for the RFID device.

7. A radio-frequency identification (RFID) antenna structure for use with a RFID device, comprising:
    a conductive layer;
    a printed electronic circuit (PEC) comprising first and second connection points and a plurality of conductors assembled onto the conductive layer, such that the plurality of conductors bridge a position to create part of a RFID antenna; and
    wherein the conductive layer is cut to create an antenna for the RFID device and the plurality of conductors are transparent at a frequency of operation of a laser, such that the conductive layer is cut without damaging the plurality of conductors.

8. The RFID antenna structure of claim 7, wherein the conductive layer is aluminum foil.

9. The RFID antenna structure of claim 8, wherein the conductive layer is substantially flat.

10. The RFID antenna structure of claim 9, wherein the conductive layer is cut using a laser.

11. The RFID antenna structure of claim 10, wherein the conductive layer is cut post process to create an antenna for the RFID device.

12. The RFID antenna of claim 11, wherein cutting of antennas is done through the PEC.

13. The RFID antenna of claim 7, wherein focusing the laser is dependent on depth, such that energy at a height above a surface where PEC conductor is placed is relatively diffuse compared to concentrated energy at surface of the aluminum foil.

14. The RFID antenna structure of claim 13, wherein the PEC is designed to function as an ultra-high frequency (UHF) RFID chip.

15. A radio-frequency identification (RFID) antenna structure for use with a RFID device, comprising:
    a substantially flat conductive layer comprising aluminum foil;
    a printed electronic circuit (PEC) comprising first and second connection points and a plurality of conductors assembled onto the conductive layer, such that the plurality of conductors bridge a position to create part of an RFID antenna; and
    wherein the conductive layer is cut post process to create an antenna for the RFID device; and wherein cutting of antennas is done through the PEC, and
    wherein the plurality of conductors in the PEC are transparent at a frequency of a laser, such that the aluminum foil is cut without damaging the plurality of conductors.

16. The RFID antenna structure of claim 15, wherein the conductive layer is cut using a laser.

17. The RFID antenna of claim 16, wherein focusing the laser is dependent on depth, such that energy at a height above a surface where PEC conductor is placed is relatively diffuse compared to concentrated energy at surface of the aluminum foil.

18. The RFID antenna structure of claim 17, wherein the PEC is designed to function as one of a high frequency (HF), low frequency (LF), or ultra-high frequency (UHF) RFID chip.

* * * * *